Nov. 28, 1950 J. O. SIMPKISS, JR 2,531,537

MASK FOR CATHODE-RAY TUBES

Filed April 1, 1949 2 Sheets-Sheet 1

INVENTOR
John O. Simpkiss, Jr.
BY
ATTORNEY

Nov. 28, 1950 J. O. SIMPKISS, JR 2,531,537

MASK FOR CATHODE-RAY TUBES

Filed April 1, 1949 2 Sheets-Sheet 2

INVENTOR
John O. Simpkiss, Jr.
BY [signature]
ATTORNEY

Patented Nov. 28, 1950

2,531,537

UNITED STATES PATENT OFFICE 2,531,537

MASK FOR CATHODE-RAY TUBES

John O. Simpkiss, Jr., Palmyra, N. J., assignor to Radio Corporation of America, a corporation of Delaware Application April 1, 1949, Serial No. 84,793

2 Claims. (Cl. 250—141)

The present invention relates to supporting and positioning devices for cathode ray tubes, and, more particularly, but not necessarily exclusively to an improved means for positioning and masking the target end of a high voltage cathode ray tube in a manner to provide safety of operation.

In electrical apparatus employing high voltage cathode ray tubes, such as television receivers and oscillographs, it is necessary to protect a user of the apparatus from contact with high voltage parts, including parts which may become charged to a high voltage. In a television receiver and in other cathode ray tube equipment it is desirable to include a transparent non-shatterable member for covering the active face of the cathode ray tube. In accordance with the present invention the protecting device is in the form of a mask of insulating material which outlines the image area of the cathode ray tube and serves to hold the non-shatterable tube cover.

The principal aim of the present invention is to provide novel means for protecting the user of cathode ray tube apparatus from high voltage parts, which includes a provision for outlining the portion of the cathode ray tube to be viewed. Another and closely related aim or object is to provide a novel insulating mask for a cathode ray tube which serves to hold a non-shatterable cover for the face of the cathode ray tube.

Other objects and advantages of the invention will, of course, become apparent and immediately suggest themselves to those skilled in the art to which the invention is directed from a reading of the following specification in connection with the accompanying drawings in which.

Figure 1:
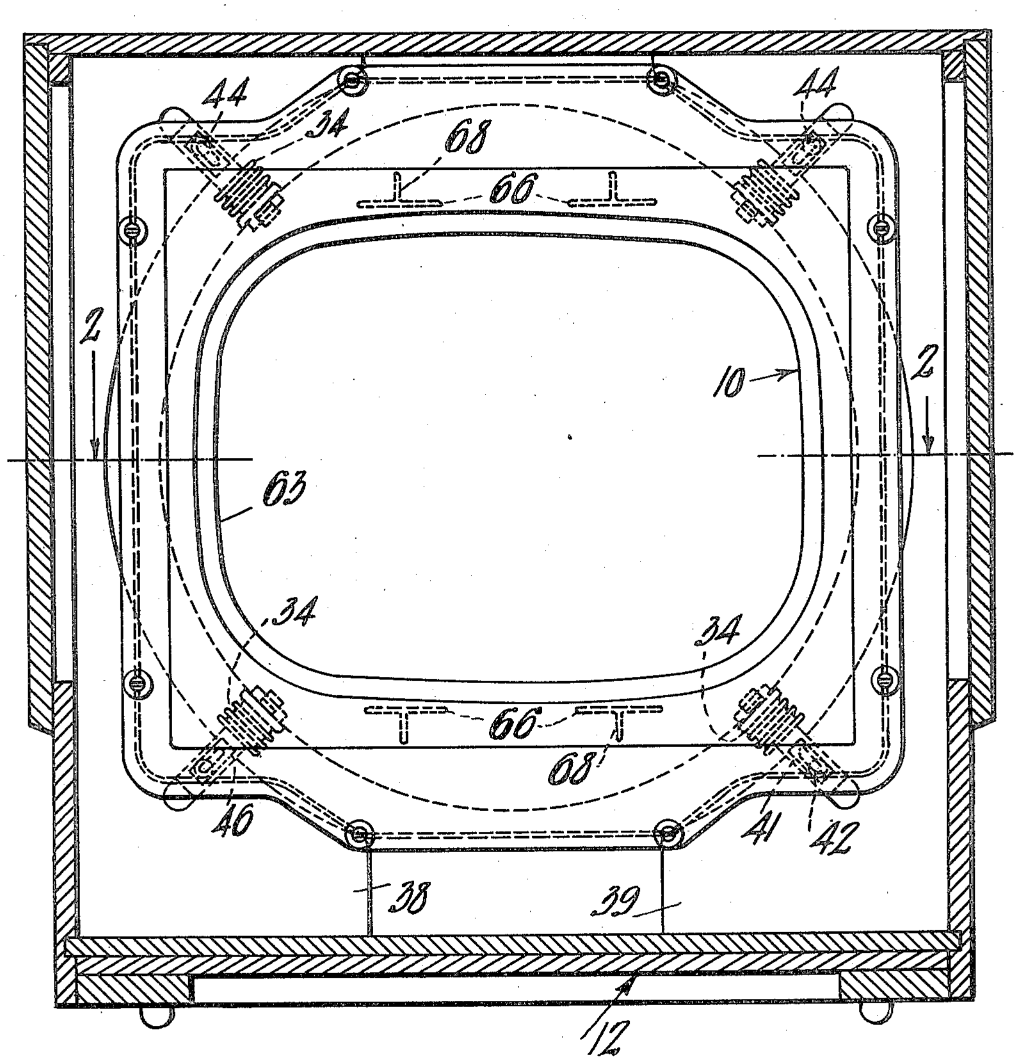
Fig. 1 is a sectional view in front elevation of cathode ray tube apparatus embodying the novel mask of this invention, the section being taken on line 1—1 of Fig. 2.

Referring now to the drawing, reference numeral 10 indicates the masking means of this invention in its entirety which is shown illustratively as being located in a cabinet or housing 12 which serves to house cathode ray tube apparatus, such for example as a television receiver having suitable means (not shown) for energizing and operating a cathode ray tube 14 so that the latter will produce an image on its active exposed target face 16. The tube 14 is of the high voltage type, for example, having a conical metal portion 18 and a portion of glass 20 which includes the tube neck 21. A support 23 is indicated for the neck portion of the tube and this may comprise, for example, a deflecting yoke and deflecting yoke supporting means such as is shown in Patent No. 2,428,928, granted to E. B. Cain on October 14, 1947. Magnetic appliances, such as the deflecting yoke, focusing coil, and the like, associated with the cathode ray tube 14 are not shown in detail as they form no part of the present invention. The metal cone 18 of the tube 14 is connected to a suitable source (not shown) of high positive potential as indicated schematically at reference character 22. By way of example, the tube 14 may be a type 16AP4 metal cathode ray tube and in operation of this tube the metal cone may operate at 15,500 volts above ground. It is, therefore, necessary that the metal cone 18 be insulated from any grounded portion of the receiver. Also in the interest of safety, it is desirable to provide means for preventing accidental contact with parts at high voltage.

The cabinet 12 has a front wall 24 which carries a panel 26 having a frame or the like 28 through which the image appearing on the target face 16 of the tube is visible. The mask 10 of the invention is secured to the panel 26, for example, by screws 30. A transparent member 31, of safety glass or the like, is located between the back of the panel 26 and the front of the mask 10. To retain the glass in place, the mask 10 is recessed as indicated by reference character 29.

The outer rim 33 of the end of the kinescope is centered and supported with respect to the mask 10 by means of a plurality (four in the present instance) of insulators 34 which are slidably carried by panel portions 38 and 39. The material of which the insulators are formed must have a high insulating value, and "Melamine" No. 1502 of the American Cyanamid Co. is suitable for the purpose. Each insulator 34 is provided with a stem 41 which has a slot 42 for slidably receiving the shank of a bolt 44. The head of the bolt is accommodated by an elongated recess 46. The ends of the bolts 44 which project beyond the panels 38 and 39 receive nuts in the usual manner. The slidable connection of the insulators 34 provides for centering of the tube face 16 within the frame 28 and the opening in the mask 10.

The insulators may be provided with spring members (not shown) for contacting the metal cone 18 of the tube and one or more of these spring members may serve as the connection which is indicated schematically at 22.

Figures 2, 3:
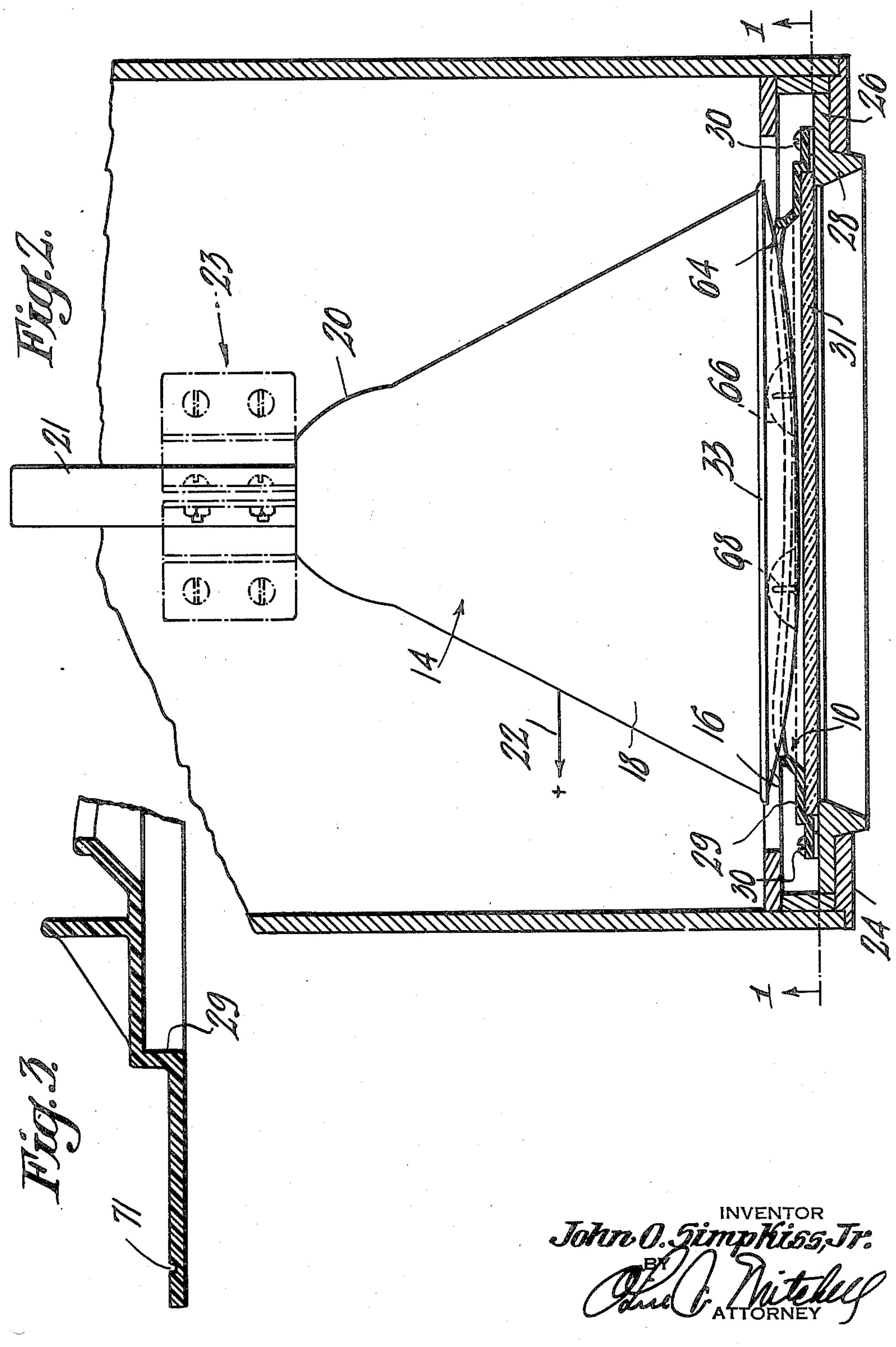
Fig. 2 is a top plan view in section of the apparatus of Fig. 1, the section being taken on line 2—2 of Fig. 1.
Fig. 3 is an enlarged fragmentary view in section of the mask of Fig. 1, the section also being taken on line 2—2 of Fig. 1.

The mask 10 is provided with an opening 63 that is of a size and configuration to outline the image area on the end 16 of the cathode ray tube 14. As shown in Fig. 2 of the drawing, this opening 63 is framed by an offset rim 64 which enables the opening 63 to more or less follow the curved contour of the tube face. Preferably, the edge or lip of the rim 64, defining the opening, is spaced from the tube face so as to provide a small air gap. This air gap is in series with the surface leakage on the tube face.

The mask 10 is provided with 4 arcuate projections or lips 66 which engage the tube face 16 to limit forward motion of the cathode ray tube 14. The face rests against these lips 66. Each lip 66 is reinforced by a bracing rib 68. The entire mask 10 shown in Figs. 1 and 2 of the drawings may be molded from plastic material of high insulating value.

A shallow scoring or groove 71 connects the apertures for the screws 30 which hold the mask in place. This scoring or groove may be filled with electrically conductive paint or the like so as to provide a means for grounding these screws thereby to prevent accumulation of static charges.

What is claimed is:

1. A mask for the face of a cathode ray tube, said mask having a generally plane portion having screw receiving apertures to provide for securing the mask to a panel, a groove in said plane portion joining said apertures, a conductive substance in said groove, an offset rim defining a viewing aperture, said rim conforming substantially to the face of a cathode ray tube, and a plurality of insulating spacing members projecting from said mask to bear against the face of a cathode ray tube.

2. In a cathode ray tube appliance, a structure having means to support a cathode ray tube, and means to provide a high voltage connection for an exposed part of the tube; an electrically insulating member in the form of a mask for the face of the tube, an opening in the mask to outline an image produced on the face of the tube, a plurality of electrically insulating spacing members projecting from said mask to position the face of a cathode ray tube held by said supporting means, apertures in said mask to accommodate fastening screws, a groove joining said apertures, a conductive substance in said groove and a recess in said mask to accommodate a transparent cover for said tube face.

JOHN O. SIMPKISS, Jr.

REFERENCES CITED

The following references are of record in the file of this patent:

UNITED STATES PATENTS

| Number | Name | Date |
|---|---|---|
| 2,165,779 | Blain | July 11, 1939 |
| 2,224,287 | Busch | Dec. 10, 1940 |
| 2,354,661 | Berejkoff | Aug. 1, 1944 |

FOREIGN PATENTS

| Number | Country | Date |
|---|---|---|
| 520,412 | Great Britain | Apr. 23, 1940 |